United States Patent
Park

(10) Patent No.: US 12,051,784 B2
(45) Date of Patent: Jul. 30, 2024

(54) SECONDARY BATTERY INTERNAL PRESSURE MEASUREMENT METHOD

(71) Applicant: SK On Co., Ltd., Seoul (KR)

(72) Inventor: Sang Jun Park, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/324,501

(22) Filed: May 26, 2023

(65) Prior Publication Data
US 2023/0402657 A1 Dec. 14, 2023

(30) Foreign Application Priority Data
Jun. 14, 2022 (KR) .......................... 10-2022-0072167

(51) Int. Cl.
*H01M 10/42* (2006.01)
*G01N 3/12* (2006.01)
*H01M 50/30* (2021.01)

(52) U.S. Cl.
CPC .......... *H01M 10/4228* (2013.01); *G01N 3/12* (2013.01); *H01M 50/30* (2021.01); *G01N 2203/0044* (2013.01)

(58) Field of Classification Search
CPC .... H01M 10/4228; H01M 50/30; G01N 3/12; G01N 2203/0044
See application file for complete search history.

(56) References Cited

U.S. PATENT DOCUMENTS

| | | | |
|---|---|---|---|
| 2017/0269017 A1* | 9/2017 | Klein | G01N 27/20 |
| 2019/0355940 A1* | 11/2019 | Satou | H01M 50/103 |
| 2020/0386816 A1* | 12/2020 | Jeong | H01M 10/44 |
| 2021/0172827 A1* | 6/2021 | Hwang | H01M 10/4228 |

FOREIGN PATENT DOCUMENTS

| | | | |
|---|---|---|---|
| JP | H09120845 A | | 5/1997 |
| KR | 10-2014-0140431 A | | 12/2014 |
| KR | 2014014043 | * | 12/2014 |
| KR | 1020180100748 A | | 9/2018 |
| KR | 10-2150759 B1 | | 9/2020 |

OTHER PUBLICATIONS

Extended European Search Report for the European Patent Application No. 23176566.0 issued by the European Patent Office on Oct. 27, 2023.

* cited by examiner

*Primary Examiner* — Lisa S Park

(74) *Attorney, Agent, or Firm* — IP & T GROUP LLP

(57) ABSTRACT

In order to more accurately measure internal pressure of a secondary battery, the present disclosure provides a measurement method including (a) interposing the secondary battery between an upper plate and a lower plate, (b) increasing internal pressure of the secondary battery by injecting a gas into the inside of the secondary battery, (c) monitoring surface pressure of the secondary battery at a measuring member which is in contact with the lower plate, and (d) measuring a value of the surface pressure from the measuring member at a point in time when at least one sealing portion of the secondary battery is vented.

12 Claims, 5 Drawing Sheets

FIG. 2
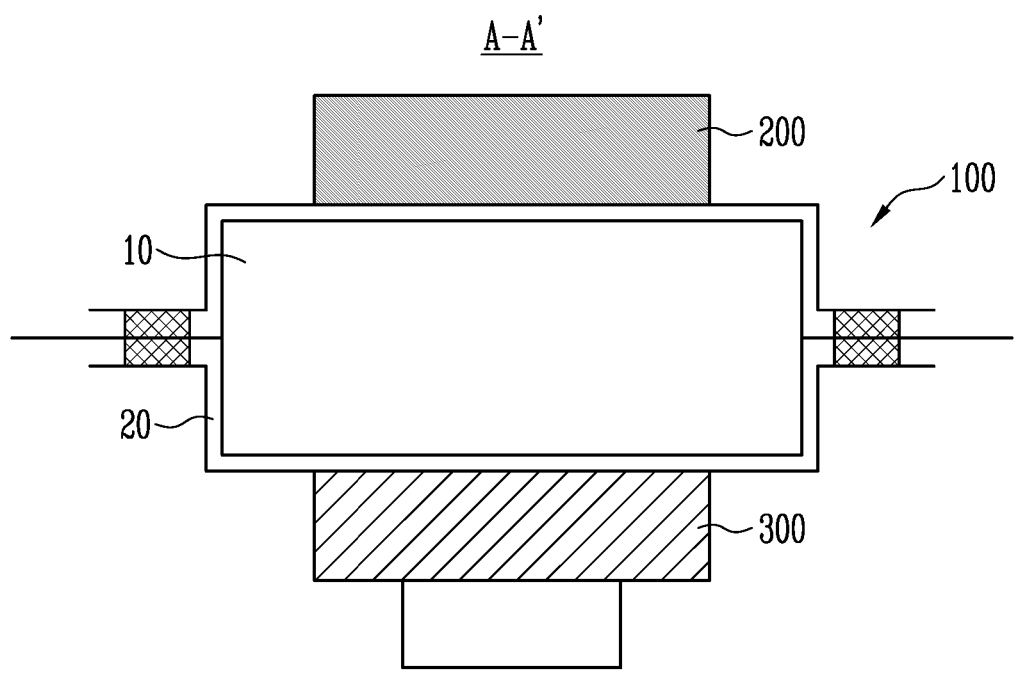
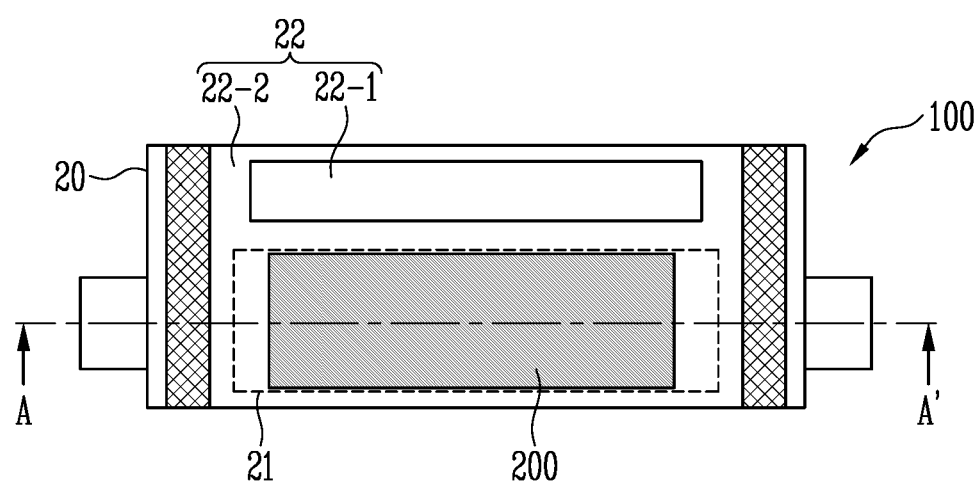

FIG. 3
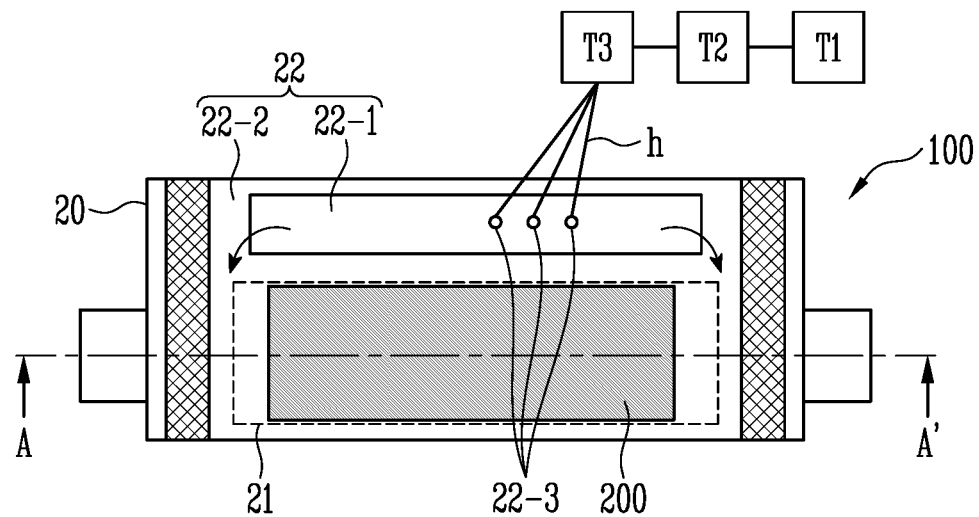
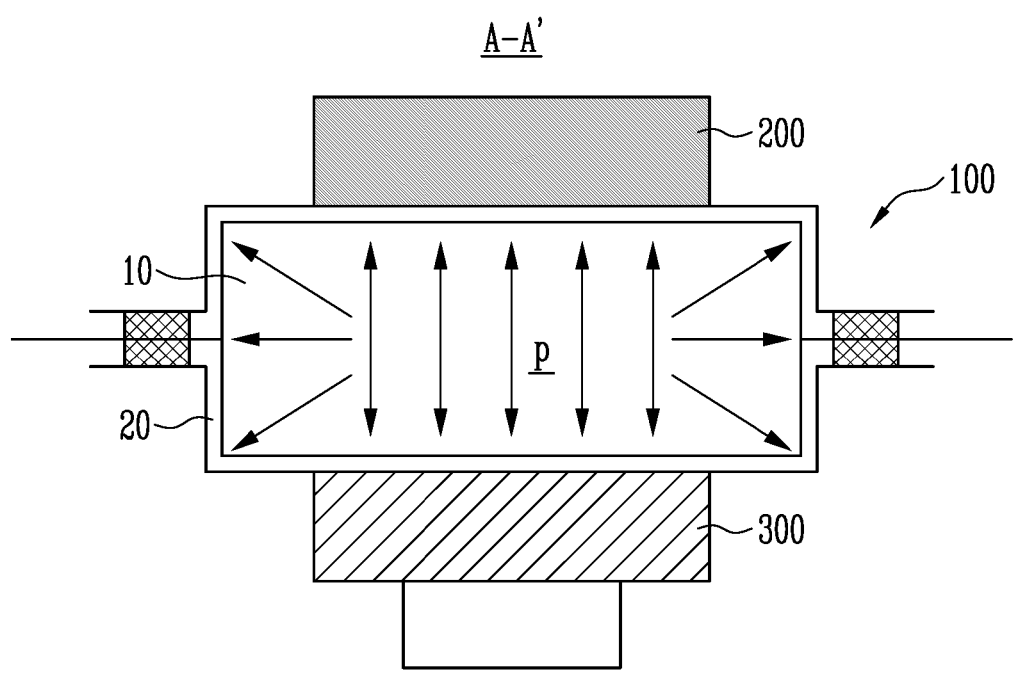

FIG. 5
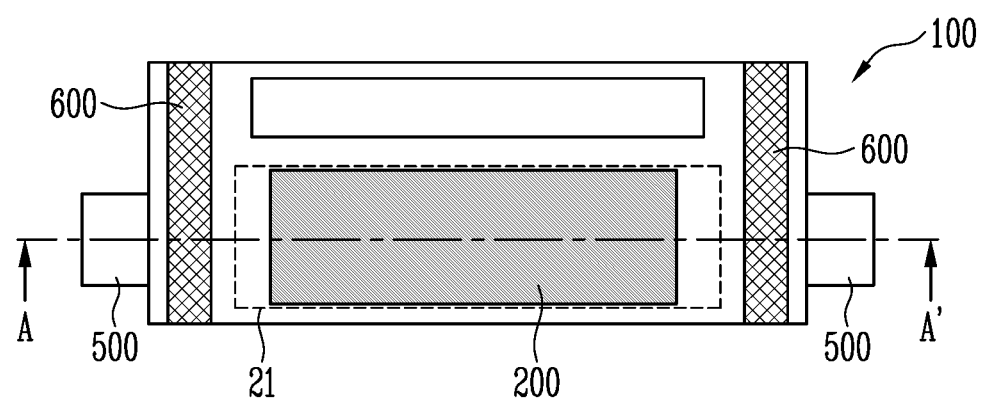
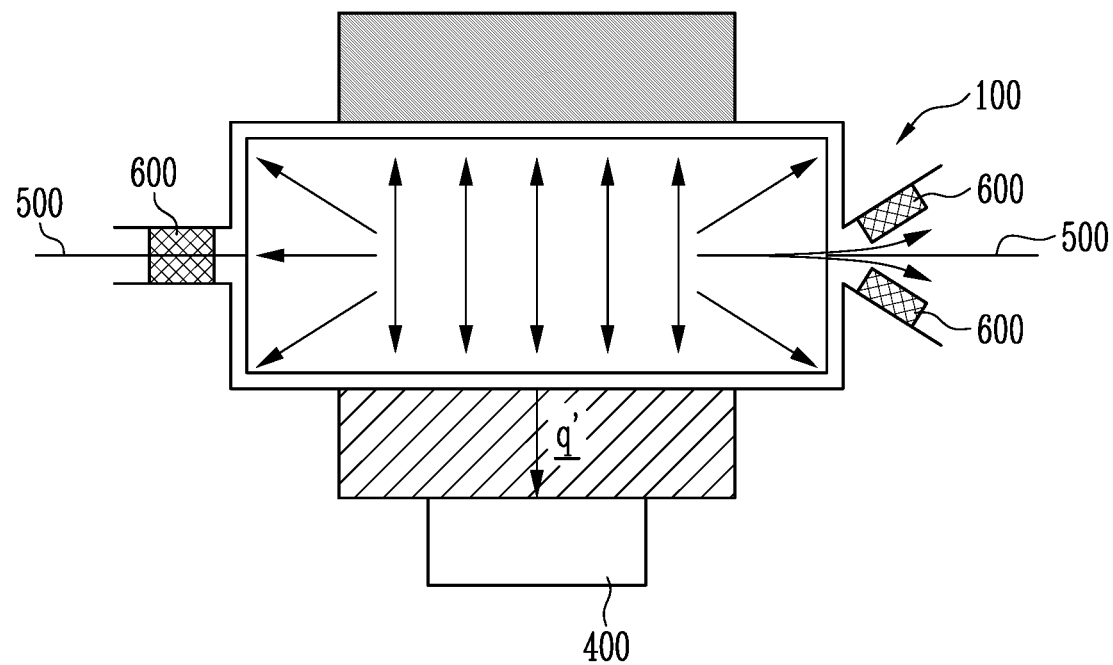

SECONDARY BATTERY INTERNAL PRESSURE MEASUREMENT METHOD

CROSS-REFERENCE TO RELATED APPLICATION

The present application claims priority under 35 U.S.C. § 119(a) to Korean patent application number 10-2022-0072167 filed on Jun. 14, 2022, in the Korean Intellectual Property Office, the entire disclosure of which is incorporated by reference herein.

BACKGROUND

1. Technical Field

The present disclosure relates to a method of measuring internal pressure of a secondary battery that is able to more accurately measure the internal pressure of the secondary battery.

2. Related Art

Secondary batteries are rechargeable batteries and are used in mobile phones, laptops, digital cameras, electric vehicles, etc. Lithium secondary batteries, which are the most used among secondary batteries, have the advantages of high operating voltage and large energy density.

However, the lithium secondary batteries have heat generation issues caused by internal short circuit, overcharge and overdischarge, etc. In addition, the lithium secondary batteries have various issues that threaten stability such as electrolyte decomposition, thermal runaway, etc.

In particular, explosion of the lithium secondary battery may occur due to decomposition of electrolyte and an increase in gas pressure inside the secondary battery. Specifically, during repeated charging and discharging of the lithium secondary battery, gas is generated due to the electrochemical reaction between the electrolyte and an electrode active material. The generated gas increases the internal pressure of the lithium secondary battery, causing issues such as electrode deformation, internal short circuit, explosion, etc.

In order to solve the stability issues of the lithium secondary batteries, it is required to measure the internal pressure that an external material accommodating the electrode assembly can withstand. Currently, as a method of measuring the internal pressure, after continuously injecting a gas inside the external material, the maximum pressure of the injected gas at the time when a sealing portion of the external material is vented is determined as the internal pressure of the secondary battery.

However, in the process of measuring the internal pressure of the secondary battery, an issue may occur in which the pressure of the injected gas is lost by a minute leak or the like. Due to this, there was a limitation in the method of indirectly measuring the internal pressure of the secondary battery through the pressure of the injected gas.

Therefore, in order to solve the stability issues of the lithium secondary battery, a method that is able to measure the internal pressure of the secondary battery more precisely is required.

SUMMARY

Embodiments provide a method of measuring internal pressure of a secondary battery in which a measuring member capable of measuring surface pressure of the secondary battery is introduced in order to more accurately measure the internal pressure of the secondary battery.

In accordance with an aspect of the present disclosure, there is provided a measurement method including (a) interposing a secondary battery between an upper plate and a lower plate, (b) increasing internal pressure of the secondary battery by injecting a gas into the inside of the secondary battery, (c) monitoring surface pressure of the secondary battery at a measuring member which is in contact with the lower plate, and (d) measuring a value of the surface pressure from the measuring member at a time in time when at least one sealing portion of the secondary battery is vented.

In accordance with an embodiment, the secondary battery may include an electrode assembly and an external material for accommodating the electrode assembly.

In accordance with an embodiment, the external material may include a first area for accommodating the electrode assembly and a second area including a space in which the gas is injected.

In accordance with an embodiment, the upper plate and the lower plate in step (a) may fix the first area.

In accordance with an embodiment, the gas in step (b) may be injected at a predetermined time interval.

In accordance with an embodiment, the gas in step (b) may be injected through a hole formed in the second area.

In accordance with an embodiment, the internal pressure in step (b) may be pressure of the gas injected into the secondary battery.

In accordance with an embodiment, the internal pressure in step (b) may be increased using a regulator.

In accordance with an embodiment, step (b) may further include monitoring the internal pressure of the secondary battery.

In accordance with an embodiment, the measuring member in step (c) may be in contact with a bottom surface of the lower plate.

In accordance with an embodiment, the measuring member in step (c) may be a load cell.

In accordance with an embodiment, the surface pressure in step (c) may be a value monitored in a pressure display unit indicating pressure applied to the measuring member.

In accordance with an embodiment, step (c) may further include comparing a value of the internal pressure of the secondary battery and a value of the surface pressure of the secondary battery.

In accordance with an embodiment, the sealing portion in step (d) may be formed on an outer periphery where an electrode tab is present.

In accordance with an embodiment, step (d) may further include calculating the value of the surface pressure as a value of the maximum internal pressure of the secondary battery A measurement method according to the present disclosure introduces a measuring member capable of measuring the surface pressure of the secondary battery, thereby having an effect of directly measuring the internal pressure of the secondary battery.

In addition, the measurement method according to the present disclosure directly measures the internal pressure of the secondary battery, thereby having an effect of accurately measuring the internal pressure of the secondary battery.

In addition, the measurement method according to the present disclosure measures the pressure of the gas injected into the secondary battery and at the same time measures the surface pressure of the secondary battery, thereby having the effect of accurately measuring the internal pressure of the secondary battery even if a pressure loss of the gas injected into the secondary battery occurs.

In addition, the measurement method according to the present disclosure compares the pressure of the gas injected into the secondary battery with the surface pressure of the secondary battery in real time, thereby having the effect of predicting the error range of the internal pressure measurement result of the secondary battery generated according to the pressure of the gas.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 2 schematically illustrates a secondary battery structure interposed between an upper plate and a lower plate.

FIG. 3 schematically illustrates a form in which the internal pressure of the secondary battery is increased by injecting a gas into the inside of the secondary battery.

FIG. 5 schematically illustrates a structure of a sealing portion of the secondary battery and a structure of the measuring member for measuring a value of the surface pressure at a point in time when the sealing portion is vented.

DETAILED DESCRIPTION

The specific structural or functional description disclosed herein is merely illustrative for the purpose of describing embodiments according to the concept of the present disclosure. The embodiments according to the concept of the present disclosure can be implemented in various forms in addition to the embodiments disclosed in this specification or application. In addition, the technical idea of the present disclosure is not construed as limited to the embodiments disclosed in this specification or application.

Hereinafter, the present disclosure will be described in detail.

A measurement method according to the present disclosure includes (a) interposing a secondary battery between an upper plate and a lower plate, (b) increasing internal pressure of the secondary battery by injecting a gas into the inside of the secondary battery, (c) monitoring surface pressure of the secondary battery at a measuring member which is in contact with the lower plate, and (d) measuring a value of the surface pressure from the measuring member at a point in time when at least one sealing portion of the secondary battery is vented.

Figure 1:
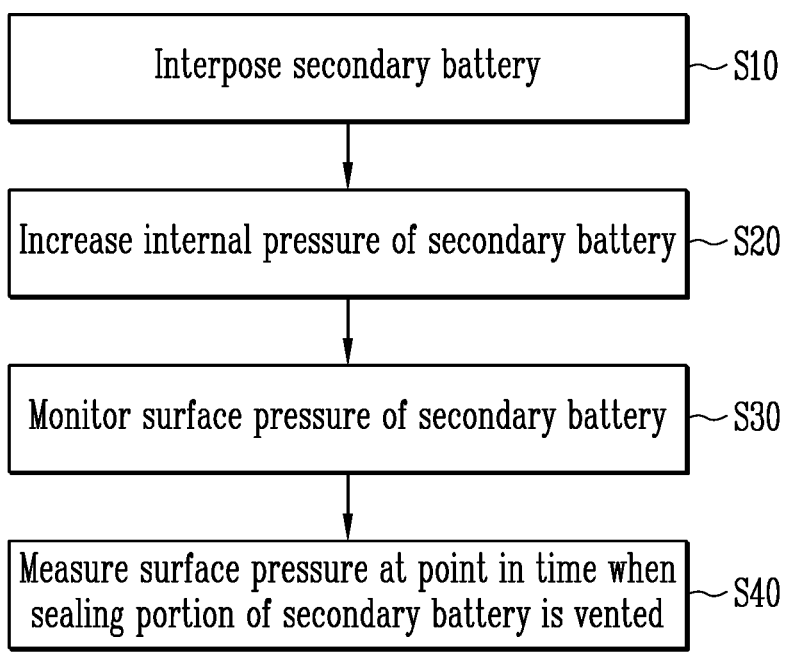
FIG. 1 schematically illustrates a flowchart for a method of measuring internal pressure of a secondary battery in accordance with an embodiment of the present disclosure.

FIG. 1 schematically illustrates a flowchart for a method of measuring internal pressure of a secondary battery in accordance with an embodiment of the present disclosure, and FIG. 2 schematically illustrates a secondary battery structure interposed between an upper plate and a lower plate.

Referring to FIGS. 1 and 2, the method of measuring the internal pressure of the secondary battery includes step S10 of interposing the secondary battery. In step S10, a secondary battery 100 is interposed between an upper plate 200 and a lower plate 300. The upper plate 200 and the lower plate 300 may have a disk shape with a specific thickness. The upper plate 200 may be in contact with one surface of the secondary battery 100. The lower plate 300 may be in contact with the other surface of the secondary battery 100. The secondary battery 100 seated on the lower plate 300 may be in the form that the upper plate 200 covers its other surface. The width of the upper plate 200 and the lower plate 300 may be the same as or different from the width of the secondary battery 100 in contact therewith, and the secondary battery 100 may be altered to different sizes as long as the secondary battery 100 does not depart or significantly deviate from the placement in which the secondary battery 100 was originally interposed. The upper plate 200 and the lower plate 300 may be fixed by a fastening means, but is not limited thereto.

The secondary battery 100 may include an electrode assembly 10 and an external material 20 for accommodating the electrode assembly 10.

The electrode assembly 10 may include a structure in which a cathode, an anode, and a separator interposed between the cathode and the anode are stacked. The cathode may include a cathode active material into which Lithium (Li) ions can be inserted and detached, and the anode may include an anode active material into which Lithium (Li) ions can be absorbed and detached. In addition, the cathode and the anode may further include binders and conductive materials in each of the cathode and anode active materials for improving mechanical stability and electrical conductivity. A separator may be configured to prevent electrical short circuits between the cathode and the anode and to generate the flow of ions. The type of the separator is not particularly limited, but may include a porous polymer film. The electrode assembly 10 may be manufactured by a stacking or zigzag stacking method by alternately stacking a plurality of cathodes and anodes and interposing separators between cathodes and anodes.

An external material 20 serves to protect the electrode assembly 10 from the external environment. The external material 20 may include a water-resistant resin and may be in the form of a film in which a polyolefin-based resin, a metal, a nylon resin and a polyterephthalate resin are laminated.

The external material 20 may include a first area 21 for accommodating the electrode assembly 10 and a second area 22 including a space in which a gas is injected. In addition, the upper plate 200 and the lower plate 300 may fix the first area 21. The upper plate 200 and the lower plate 300 may compress so that the first area 21 accommodating the electrode assembly 10 does not inflate by the injection of the gas. As the first area 21 is compressed, the second area 22 is inflated by the injection of the gas, and the internal pressure of the secondary battery 100 increases as the injection amount of the gas increases, thereby the sealing portion of the secondary battery 100 may be vented.

FIG. 3 schematically illustrates a form in which the internal pressure of the secondary battery is increased by injecting the gas into the inside of the secondary battery.

Referring to FIGS. 1 and 3, the method of measuring the internal pressure of the secondary battery includes step S20 of increasing the internal pressure of the secondary battery. In step S20, the gas is injected into the inside of the secondary battery 100, thereby increasing internal pressure p of the secondary battery 100. The type of the gas injected into the inside of the secondary battery 100 is not particularly limited. In addition to the gas generated by the electrochemical reaction between the electrolyte and the electrode active material during repeated charging and discharging of the secondary battery 100, carbon monoxide, carbon dioxide, hydrogen, dry air, nitrogen, and the like may be used to measure the internal pressure of the secondary battery. The gas may be injected through holes 22-3 formed in the second area 22. The second area 22 may include a gas pocket area 22-1 capable of accommodating the gas injected through the hole 22-3 and other areas 22-2, and the hole 22-3 may be formed using a needle on the gas pocket area 22-1.

The internal pressure p of the secondary battery 100 may be the pressure of the gas injected into the secondary battery. The internal pressure p of the secondary battery 100 may be increased using a regulator T2. In addition, the gas may be injected into the inside of the secondary battery 100 using the regulator T2 at a predetermined time interval. The regulator T2 is in communication with a gas injection unit T1 and a gas exhaust unit T3, so that the internal pressure p of the secondary battery 100 may be constantly increased to a desired level. The gas regulated by the regulator T2 may be injected into the inside of the secondary battery 100 through a gas injection pathway h communicating with the gas exhaust unit T3 and the hole 22-3.

In step S20, the internal pressure p of the secondary battery 100 may be monitored. The internal pressure p of the secondary battery 100 may be indirectly monitored through the pressure of the gas injected into the inside of the secondary battery 100. The pressure of the gas injected into the inside of the secondary battery 100 may be monitored using the regulator T2. By monitoring the internal pressure p of the secondary battery 100 in real time, a value of the internal pressure at the point in time when at least one sealing portion of the secondary battery 100 is vented may be indirectly measured.

Figure 4:
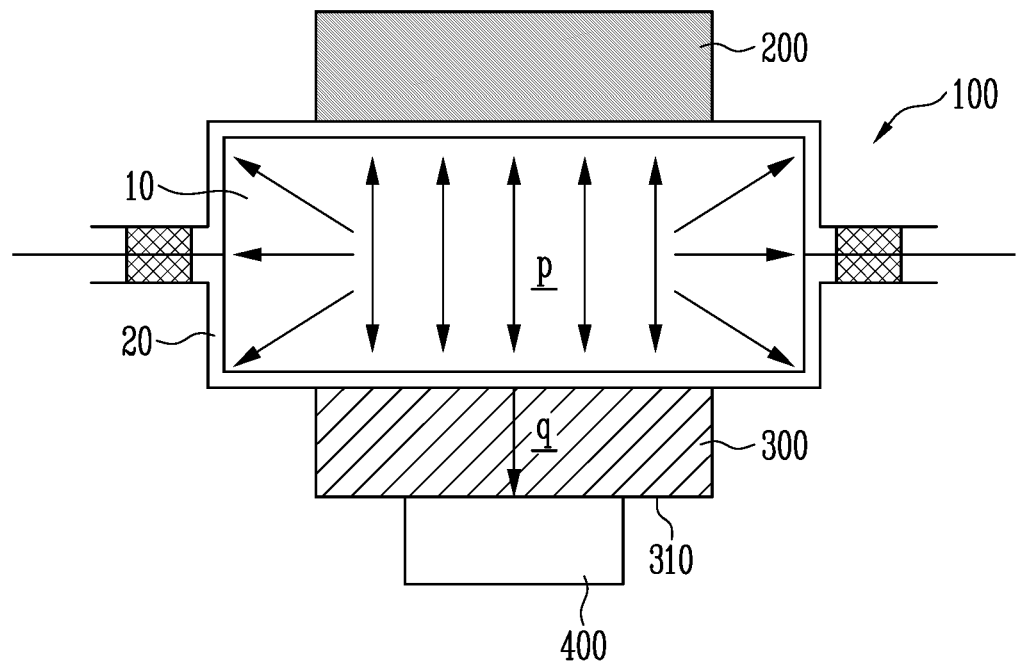
FIG. 4 schematically illustrates a structure of a measuring member for monitoring surface pressure of the secondary battery.

FIG. 4 schematically illustrates a structure of a measuring member for monitoring the surface pressure of the secondary battery.

Referring to FIGS. 1, 3 and 4, a method of measuring the internal pressure of the secondary battery includes step S30 of monitoring the surface pressure of the secondary battery. In step S30, the surface pressure q of the secondary battery 100 is monitored at the measuring member 400 which is in contact with the lower plate 300. The measuring member 400 may be in contact with the bottom surface 310 of the lower plate. The internal pressure p of the secondary battery 100 may be transmitted to the measuring member 400 through the lower plate 300, and the surface pressure q of the secondary battery 100 may be measured at the measuring member 400, to monitor a change in the internal pressure p of the secondary battery 100 in real time.

The surface pressure q of the secondary battery 100 may be a value monitored by the pressure display unit indicating the pressure applied to the measuring member 400. The measuring member 400 is not particularly limited as long as it is a device for measuring the surface pressure q of the secondary battery 100, but may preferably be a load cell. The load cell may measure the value of the surface pressure q of the secondary battery 100 generated as the secondary battery 100 is inflated by the injection of the gas, and may output the value as an electrical signal at the pressure display.

In step S30, the value of the internal pressure p of the secondary battery 100 and the value of the surface pressure q of the secondary battery 100 may be compared. The value of the internal pressure p of the secondary battery 100 may be measured through the pressure display unit of the regulator T2, and the value of the surface pressure q of the secondary battery 100 may be measured through the pressure display unit of the load cell 400. By comparing the value of the internal pressure p of the secondary battery 100 and the value of the surface pressure q of the secondary battery 100 in real time, the error value between the value of the internal pressure p of the secondary battery 100 generated by the pressure of the gas injected into the secondary battery 100 and the value of the surface pressure q of the secondary battery 100 may be quantified, and the error range between the value of the internal pressure p of the secondary battery 100 and the value of the surface pressure q of the secondary battery 100 may be predicted.

FIG. 5 schematically illustrates a structure of the sealing portion of the secondary battery and a structure of the measuring member for measuring the value of the surface pressure at the point in time when the sealing portion is vented.

Referring to FIGS. 1, 2 and 5, a sealing portion 600 may be formed on the outer periphery where an electrode tab 500 is present, and may be formed by thermal bonding to one another along the outer periphery of an upper case and a lower case. The electrode tab 500 may be electrically connected to the electrode assembly 10. The electrode tap 500 may extend to the outside of the external material 20 accommodating the electrode assembly 10 to become an electrode terminal. For example, an electrode tab which is electrically connected to a plurality of cathodes may be a cathode terminal, and an electrode tab which is electrically connected to a plurality of anodes may be an anode terminal. The method of measuring the internal pressure of the secondary battery includes step S40 of measuring the surface pressure at the point in time when the sealing portion of the secondary battery is vented. In step S40, a value of the surface pressure q' is measured from the measuring member 400 at the point in time when at least one sealing portion 600 of the secondary battery 100 is vented.

The measuring member 400 measures the value of the surface pressure q' at the point in time when at least one sealing portion 600 of the secondary battery 100 is vented, and the time when the sealing portion 600 is vented means a time when the gas injected into the inside of the secondary battery 100 is ejected to the outside through the sealing portion 600. In step S40, the value of the surface pressure q' at the point in time when at least one sealing portion 600 of the secondary battery 100 is vented may be calculated as the value of the maximum internal pressure of the secondary battery 100. The value of the maximum internal pressure of the secondary battery 100 means a critical pressure at which the sealing portion 600 of the secondary battery 100 is not vented. The maximum internal pressure at the point in time when the sealing portion 600 of the secondary battery 100 is vented may be transmitted to the measuring member 400 through the lower plate 300, and the measuring member 400 may measure the value of the surface pressure q' of the secondary battery generated at the point in time when the sealing portion 600 of the secondary battery 100 is vented, thereby calculating as the value of the maximum internal pressure of the secondary battery 100.

By measuring the value of the surface pressure q' at the point in time when at least one sealing portion 600 of the secondary battery 100 is vented by the measuring member 400, the internal pressure of the secondary battery may be more accurately measured in comparison to indirectly measuring the pressure of the gas injected into the secondary battery as the value of the internal pressure p of the secondary battery 100.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A method of measuring internal pressure of a secondary battery, wherein the secondary battery comprises an electrode assembly, an external material for accommodating the electrode assembly, and an electrode tab extending to the outside of the external material, wherein the external material includes a first area for accommodating the electrode assembly and a second area communicating with the first area and defining a space in which a gas is injected and wherein the second area is adjacent to the first area along an extending direction of the electrode tab, the method comprising:
(a) interposing the first area of the external material between an upper plate and a lower plate;
(b) increasing the internal pressure of the secondary battery by injecting the gas into the inside of the secondary battery;
(c) monitoring surface pressure of the secondary battery at a measuring member which is in contact with the lower plate; and
(d) measuring a value of the surface pressure from the measuring member at a point in time when at least one sealing portion of the secondary battery is vented,
wherein the gas in step (b) is injected through a hole located away from the first area and defined at the second area.

2. The method of claim 1, wherein the upper plate and the lower plate in step (a) fix the first area.

3. The method of claim 1, wherein the gas in step (b) is injected at a predetermined time interval.

4. The method of claim 1, wherein the internal pressure in step (b) is pressure of the gas injected into the secondary battery.

5. The method of claim 1, wherein the internal pressure in step (b) is increased using a regulator.

6. The method of claim 1, wherein step (b) further comprises monitoring the internal pressure of the secondary battery.

7. The method of claim 1, wherein the measuring member in step (c) is in contact with a bottom surface of the lower plate.

8. The method of claim 1, wherein the measuring member in step (c) is a load cell.

9. The method of claim 1, wherein the surface pressure in step (c) is a value monitored in a pressure display unit indicating pressure applied to the measuring member.

10. The method of claim 1, wherein step (c) further comprises comparing a value of the internal pressure of the secondary battery and a value of the surface pressure of the secondary battery.

11. The method of claim 1, wherein the sealing portion in step (d) is formed on an outer periphery where the electrode tab is present.

12. The method of claim 1, wherein step (d) further comprises calculating the value of the surface pressure as a maximum value of the internal pressure of the secondary battery.

* * * * *